United States Patent

Duthie et al.

[11] Patent Number: 5,056,615
[45] Date of Patent: Oct. 15, 1991

[54] VEHICLE CONTROL SYSTEM

[75] Inventors: Anthony J. Duthie; Mark Cullen, both of Horsham, United Kingdom

[73] Assignee: Johnston Engineering Limited, Surrey, United Kingdom

[21] Appl. No.: 509,364

[22] Filed: Apr. 16, 1990

[30] Foreign Application Priority Data

Jul. 12, 1989 [GB] United Kingdom ............ 8915937

[51] Int. Cl.⁵ .................................... B60K 17/00
[52] U.S. Cl. ................................... 180/306; 60/443; 180/53.4; 180/307
[58] Field of Search ............. 180/306, 307, 53.4, 180/305; 60/443

[56] References Cited

U.S. PATENT DOCUMENTS

| 4,400,935 | 8/1983 | Louis | 180/307 |
| 4,553,626 | 11/1985 | Kazmierczak et al. | 180/307 |
| 4,577,712 | 3/1986 | Foote et al. | 180/53.4 |

FOREIGN PATENT DOCUMENTS

| 2805049 | 8/1978 | Fed. Rep. of Germany | 180/306 |
| 998231 | 7/1965 | United Kingdom . | |
| 2064073 | 6/1981 | United Kingdom . | |
| 2128718 | 5/1984 | United Kingdom . | |

Primary Examiner—Andres Kashnikow
Assistant Examiner—Eric Culbreth
Attorney, Agent, or Firm—Young & Thompson

[57] ABSTRACT

This invention relates to improved control systems for vehicles which require power to prepare the vehicle itself and to drive auxiliary equipment mounted on the vehicle. A land vehicle has hydrostatic transmission to drive at least one roadwheel to propel the vehicle, an engine connected to drive both the hydrostatic transmission and auxiliary equipment mounted on the vehicle, a hydraulic pressure supply to the transmission and a speed control for the vehicle. The speed control controls the pressure supply of the transmission and the speed of the engine whereby the engine speed is restricted to a preset limit when the auxiliary equipment is operating and the speed of the engine can be increased when the auxiliary equipment is inert and the vehicle in transit. This results in a more efficient and better controllable vehicle, particularly working vehicles such as roadsweepers, agricultural and construction vehicles.

19 Claims, 3 Drawing Sheets

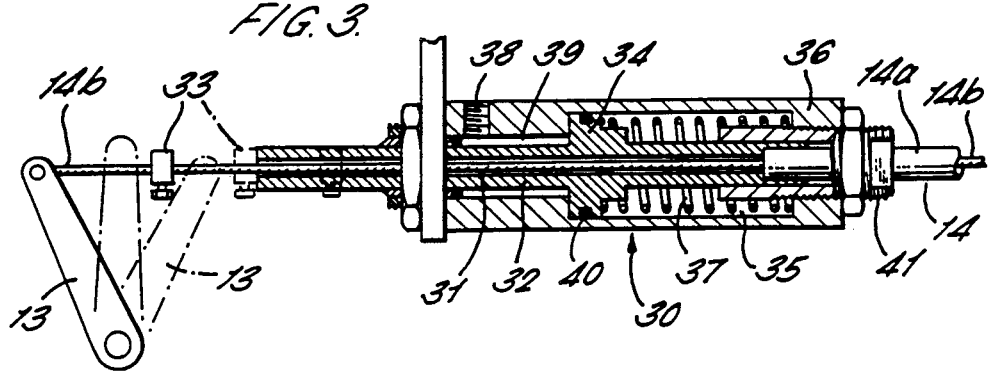
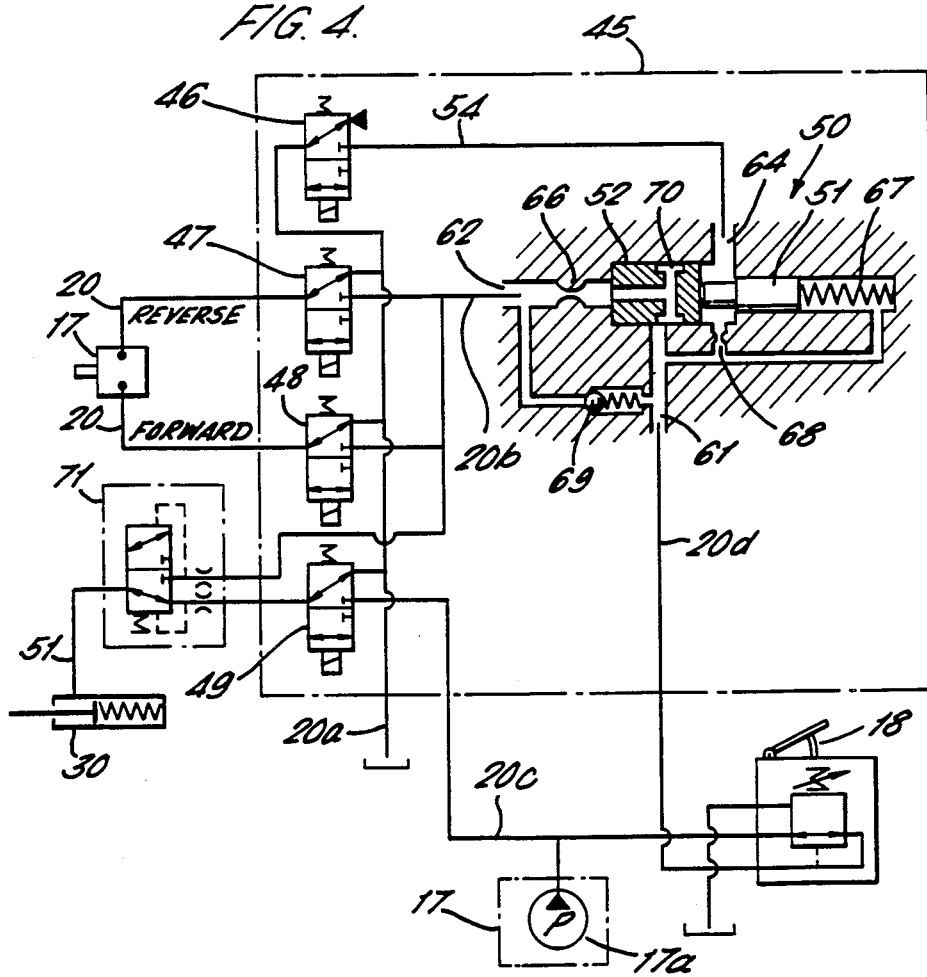

VEHICLE CONTROL SYSTEM

This invention relates to improved control systems for vehicles which require power to propel the vehicle itself and to drive auxiliary equipment mounted on the vehicle.

Hydrostatic transmissions are now very popular in the embodiment of vehicles, such as road sweeping, construction and agricultural vehicles. Such vehicles are commonly known as "working" vehicles as they incorporate power driven auxiliary equipment such as sweeping brushes, suction fans, winches, buckets, harrows and the like. These vehicles are generally equipped with an engine set to run at a uniform speed, which must be fast enough to produce sufficient power to drive the auxiliary equipment and to propel the vehicle. These vehicles are generally either stationary or moving slowly whilst the auxiliary equipment is operating, i.e. in "work mode", or moving at a higher speed whilst the auxiliary equipment is not functioning i.e. in "transit mode".

The use of hydrostatic transmission provides the means to vary the forward motion of the vehicle and enable smooth connection and disconnection of the engine to the vehicle wheels. In known systems the hydrostatic transmission comprises a hydrostatic pump and hydraulic motors which drive the wheels of the vehicle. The pump is driven by the vehicle engine and the motors are driven by the pump. Forward motion of the vehicle is often controlled by a foot pedal, the deflection of which alters the output of the pump to the motors. Full deflection of the pedal generally produces maximum speed of the vehicle. The engine speed is usually controlled by a hand throttle, set to operate the engine at fixed speeds.

In work mode the engine is set to run at a speed, say 2000 rpm, which limits noise emission and optimises the life of the equipment. In transit mode it may be set to run at a higher speed, say 3000 rpm. Whilst a two speed can operate satisfactorily, drivers have a tendency to run the engine fast in work mode resulting in problems of added noise and depleting propulsion power. Similarly if the engine is run at full speed in transit mode it takes increased skill to control the vehicle by manipulation of the throttle and pedal simultaneously, for example, when the vehicle is required to negotiate road junctions etc.

In these working vehicles often the auxiliary equipment can account for 80% of the net power from the engine, leaving just the remaining 20% to propel the vehicle. In some cases the former figure can nearly rise to 100% when the engine is run above its set operating speed where the auxiliary equipment (such as a suction fan) would also be running at a higher speed, thereby requiring increased power.

According to the present invention there is disclosed a land vehicle having at least one drivable road wheel, hydrostatic transmission means to drive said road wheel to propel the vehicle, an engine connected to drive both said hydrostatic transmission means and auxiliary equipment mounted on said vehicle, a hydraulic pressure supply to the transmission means and means for controlling the speed of the vehicle, said speed control means comprising means for controlling the pressure supply to the transmission means and means connected to the pressure supply control means to control the speed of the engine whereby the engine speed is restricted to a preset limit when the auxiliary equipment is operating and the speed of the engine can be increased when the auxiliary equipment is inert and the vehicle in transit.

A specific embodiment of the invention will now be described, by way of example only, and with reference to the accompanying drawings in which:

FIG. 3 is a sectional side elevation of a throttle actuator used in the control system of FIG. 2;

FIG. 4 is a schematic diagram of a control unit used in the control system of FIG. 2.

Figure 1:
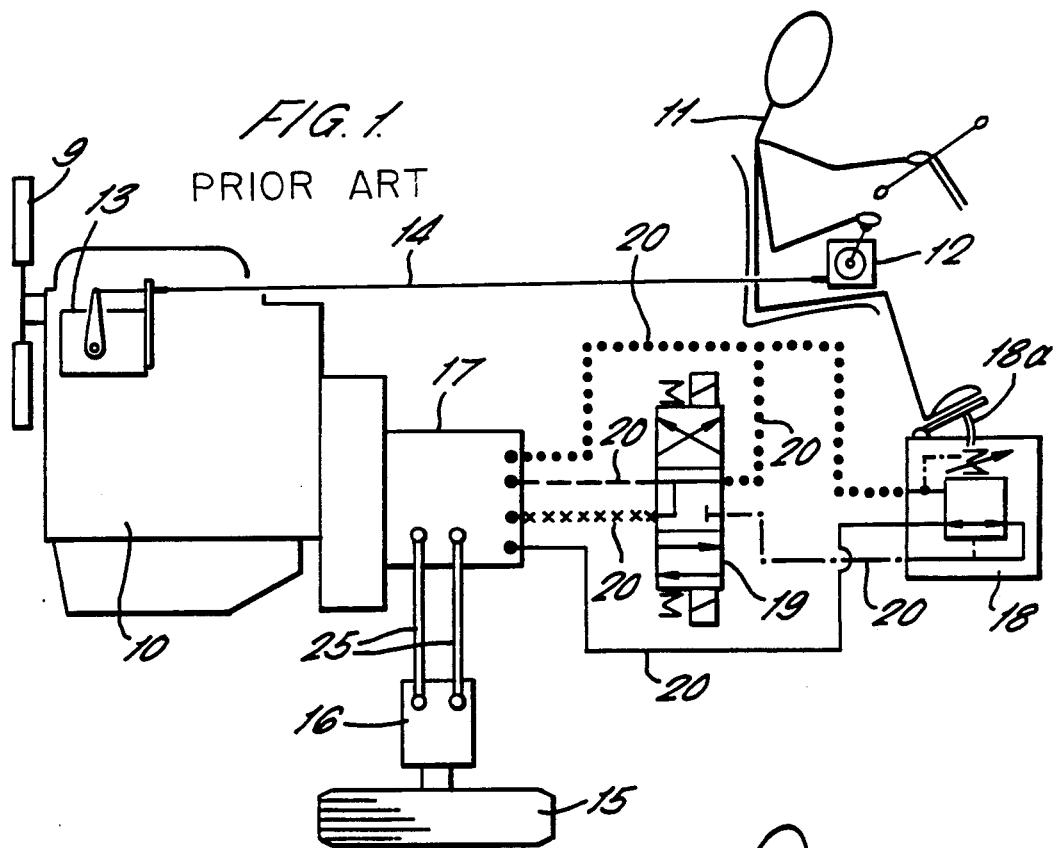
FIG. 1 is a schematic representation of a prior art control system for a working vehicle.

Referring first to FIG. 1, there is shown a typical closed loop hydrostatic control system of the prior art for a working vehicle. The vehicle is powered by an engine 10. A driver 11 of the vehicle controls the speed of the engine 10 by means of a friction type hand throttle 12 located in the driver's cab. The throttle 12 is connected by means of a throttle cable 14 to a throttle lever 13 mounted on the engine 10. The engine 10 is connected to drive auxiliary equipment 9 such as a suction fan mounted on the vehicle and to propel the vehicle.

The vehicle also has road wheels 15, only one of which is shown in FIG. 1, which are driven by one or more hydrostatic motors 16 with or without gearing. The motor 16 is driven by a transmission hydrostatic pump 17 via high pressure power transmission lines 25, and is an axial piston type of variable displacement pump. The pump 17 is driven by the engine 10. The pump 17 has external controls for the selection of forward, reverse and output flow according to the required direction and speed of movement of the vehicle.

These external controls include the aforementioned hand throttle 12 and a foot pedal activated pressure regulating valve 18 operated by the driver 11 which is linked to the pump 17 via a four port, three position directional control valve 19 which is used for selecting forward or neutral or reverse. The selections are made by the driver 11 who can electrically operate the valve 19 to select whatever function is required.

A small integral pump (not shown) within the hydrostatic pump 17 provides a servo control pressure source of about 16 bar which is used by way of the pedal regulating valve 18 to vary the output displacement of the pump 17. Servo pressure from zero to 8 bar activates the pump 17 from zero displacement to maximum displacement. The pedal valve 18 has a maximum pressure output of 12 to 14 bar when fully deflected. Control pressure decays rapidly once the pedal 18a is released and so a proportional output is achieved according to the deflection of the pedal 18a.

When in work mode the driver 11 would ease pressure on the pedal 18a to reduce the pump 17 output to the wheel motors 16 thereby to reduce the vehicle speed. He would also operate the hand throttle 12 to decrease the speed of the engine to about 2000 rpm whilst the auxiliary equipment 9 is operating. In transit mode, when auxiliary equipment 9 is not in operation, the driver 11 would operate the throttle 12 to increase the engine speed to about 3000 rpm and increase the control pressure via the pedal 18a and pedal valve 18 to move the vehicle faster.

Figure 2:
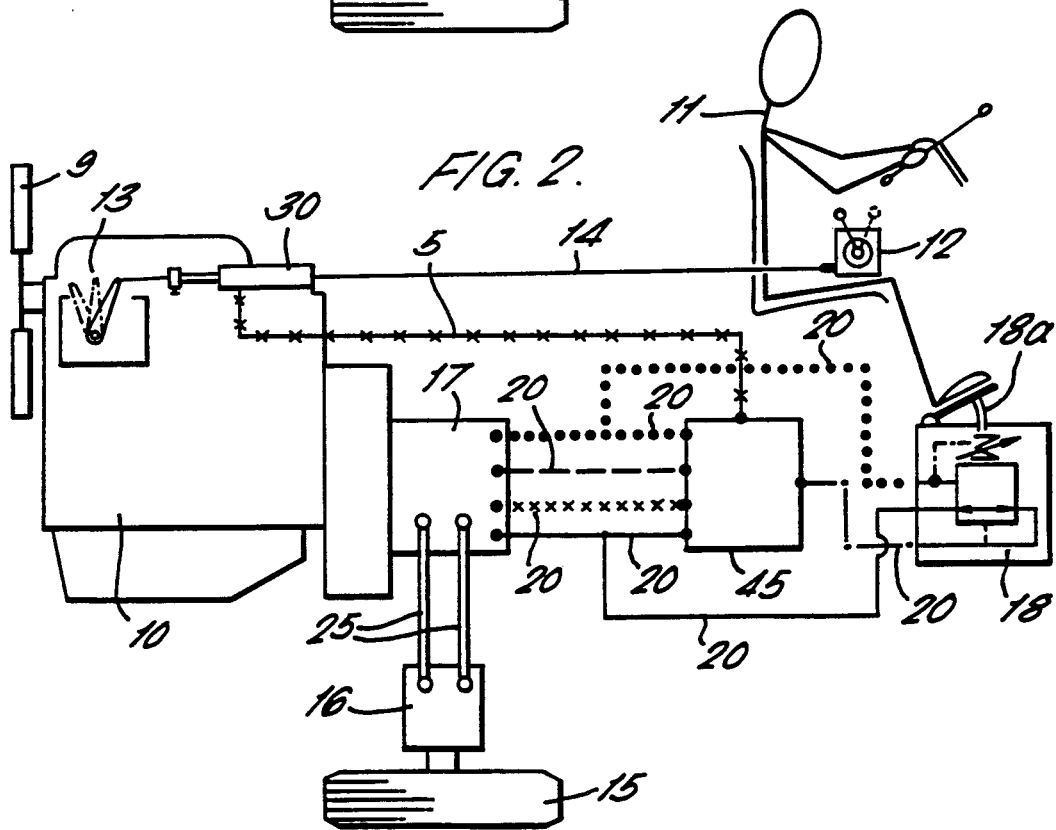
FIG. 2 is a schematic representation of an improved control system for a working vehicle.

In an improved control system as shown in FIG. 2 some features are the same as described with respect to FIG. 1. These features are numbered the same as in FIG. 1.

An actuator 30 (see FIG. 3) which is active in transit mode is used to control the engine throttle 12. The actuator 30 is mounted on the fuel injection pump (not shown) of the engine 10 and provides an anchorage for the outer sleeve 14a of the throttle cable 14. The inner core 14b of the cable 14 is permitted to move freely within a coaxial hole 31 within the spindle 32 of the actuator 30. Thus if the driver 11 manipulates the hand throttle 12 the throttle lever 13 on the injection pump moves causing the speed of the engine 10 to increase or decrease in the normal way. The cable 14 is equipped with an adjustable cable stop 33 such that the maximum speed of the engine 10 can be set and limited, to say 2000 rpm when the hand throttle 12 is moved fully.

The actuator 30 comprises a piston 34 located within a chamber 35 in the actuator casing 36. The piston 34 is integral with the spindle 32 through which the inner core of the cable 14 runs. The piston 34 is biased by means of a precompressed compression spring 37 located within the main chamber 35 to a "deactivated" position. The actuator casing 36 has a pressure inlet 38 communicating with a reduced diameter portion 39 of the chamber 35. Pressure applied to the face of the piston 34 on an opposite side of the piston 34 to the spring 37, causes the piston 34 to move against the spring 37 to compress it. A seal 40 located in the piston 34 surface prevents leakage of the fluid, by means of which the aforementioned pressure is applied, into the main chamber 35. Maximum movement of the piston 34 is limited by means of an adjustable stop ferrule 41.

The minimum pressure to start movement of the piston 34 is set to about 8 bar by way of the precompressed spring 37 with 12 bar being sufficient to cause full movement of the piston to abut with the stop ferrule 41.

Thus, when the hand throttle 12 is set to maximum, additional movement of the engine throttle lever 13 to further increase the engine speed above the nominal 2000 rpm is possible by application of pressure greater than 8 bar to the actuator inlet 38 which then moves the outer sleeve 14a of the cable which in turn pulls the lever 13 by the inner core 14b to increase engine speed. Varying the pressure in the actuator, so in turn varies the position of the lever 13 and so varies the engine speed from the nominal 2000 rpm up to a maximum of for example 3000 rpm.

FIG. 4 shows details of the control unit 45 used to control operation of the transmission pump 17 and thereby the direction and speed of the vehicle, and FIG. 2 shows how the unit 45 is connected to the rest of the system.

The control unit comprises a series of four electrical solenoid valves 46, 47, 48, 49 and a creep valve 50 which is described later. A pair of the solenoid valves 47, 48 are electrically operable by the driver 11 to select whether the vehicle is to move forward or to reverse as the valves 47, 48 are hydraulically connected to the transmission pump 17. Both valves 47, 48 are operable to be connected to either a hydraulic fluid return line 20a or the output 62 of the creep valve 50 by hydraulic line 20b. This pair of valves 47, 48 may be replaced by a single valve in a similar manner to that of the prior art system.

A third solenoid valve 49 is used to selectively operate the throttle actuator 30. The valve 49 may be operated to be connected via hydraulic line 20b to the output 62 of the creep valve 50, or to a pressure supply line 20c from servo pump 17a which provides the control pressure source for varying the output of transmission pump 17.

The pressure from the servo pump 17 is also fed via the pedal 18, to the creep valve 50.

The creep valve 50 limits maximum speed and provides sensitive slow speed control when the machine is in "work mode" with the auxiliary equipment 9 active. Control selection is by the activation of the fourth solenoid valve 46.

The creep valve 50 is a pressure regulating valve having one input 61 to which pressure from the pedal activated pressure regulating valve 18 is fed and two outputs 62, 64. The output 62, is connected to the hydraulic line 20b feeding the forward and reverse mode solenoid valves 47, 48 and the actuator solenoid valve 49. The second output 64 is connected via the fourth electical solenoid valve 46 to the fluid pressure return line 20a. Thus when the valve 46 is operated to open the vent line 54 is opened.

The creep valve 50 has a pair of pistons, pilot piston 51 and regulating piston 52. Pilot piston 51 is biased by means of a spring 67 of low force to contact the regulation piston 52 and so urge both in a left hand direction to the position shown in FIG. 4.

The ratio diameters or rather the areas of the two pistons 52,51 is approximately 2.5:1.

The regulating piston 52 has a gallery 70 to allow the passage of fluid from the fluid line 20d to outlet 62. The gallery 70 is shaped so that the piston 52 can be moved to block off partly or completely fluid line 20d.

A check valve 69 is provided to give unhindered venting of line 62 to line 20d, when pressure is reduced in the latter whenever pedal deflection is eased on the regulating valve 18.

An orifice 66 is provided to give a smooth acceleration response when increasing the hydrostatic pump 17 displacement by servo pressure increase.

A further orifice 68 allows a pressure signal to the ventable side of piston 52.

TRANSIT MODE

In transit mode when the auxiliary equipment is inert, the fourth solenoid valve 46 is de-activated as illustrated in FIG. 4. Pressure from the foot pedal valve 18 will pass through the gallery 70 in piston 52 to outlet 62 unhindered and simultaneously act on the pilot piston 51 and ventable side of piston 52 and so with the spring 67 hold the piston 52 in the left hand position as shown. In this situation, the pressure (1–12 bar) from the foot pedal valve 18 will directly without hindrance control the displacement of the hydrostatic pump 17 and operate the throttle actuator 30 via the biased shuttle valve 71 when the pressure exceeds 8 bar to overcome the precompression setting of spring 37. The speed of the vehicle is thus controlled using the pedal valve 18 regulating the pump 17 output and then by engine speed as a second stage.

When pressure from the pedal valve 18 is relaxed, the check valve 69 allows the excess pressure from the pump 17 servo system and throttle actuator 30 to vent quickly allowing both to retract to a deactivated state without displaced fluid from the pump 17 servo system and actuator 30 having to pass through the orifice 66 and piston gallery 70.

At certain times, for example when the vehicle is ascending a gradient, the displacement of the pump 17 may have to be reduced by relaxation of the pedal valve 18 to give a preferred gearing to the wheel motors 16,—i.e. improved ratio of pump 17 output to wheel motor 16 displacement. In these circumstances because pedal valve 18 pressure has fallen below the 8 bar pressure to overcome the throttle actuator 30 precompression, the engine 10 speed would have fallen to the hand throttle 12 setting of 2000 rpm. To regain full engine 10 speed, activation of the third solenoid valve 49 will apply full servo pressure to the actuator 30 by way of the biased shuttle valve 71 and so cause full movement of the engine throttle lever 13.

WORK MODE

In work mode when solenoid valve 46 is activated, the ventable side of piston 52 is depressurised. The small pressure leakage from orifice 66 is allowed to flow away freely via port 64 and vent line 54, so that the only force applied to the piston 52 is by way of the pressurised pilot valve and spring 67 to hold it in the left hand position as illustrated.

As pressure is applied to inlet 61 by virtue of the foot pedal valve 18, pressure will flow through the gallery 70 in piston 52 to control valves 47, 48 and 49, and simultaneously act on the pilot piston 51. As pressure increases, piston 52 is driven to the right as seen in FIG. 4, against the pilot piston 51 and spring 67 so that incoming pressure in port 61 is ultimately blocked. This feature is governed by the area ratio of pistons 51 and 52 and to an extent by the spring 67 so that incoming pressure is reduced to one third in port 62.

When pressure is relaxed in port 61 and simultaneously to the pilot piston 51, the regulating piston 52 will so retract further in the right hand direction against spring 67 and so allow pressure to vent via the piston's 52 internal gallery 71 to port 64, the check valve 69 will not vent in this mode due to the greater pressure in port 61.

When the creep valve 50 is active in work mode as described, the maximum output pressure is limited to 4 bar when the maximum inlet pressure from the pedal valve 18 is 12 bar. This function so provides an increased proportional sensitivity to the pedal and limits maximum speed because full displacement of the pump 17 is limited to 50%.

Because pressure does not approach the 8 bar necessary to overcome the precompression of the spring 37 in the actuator 30 it remains dormant in this work mode and so does not speed the engine 10 above the 2000 rpm limitation.

Figure 5:
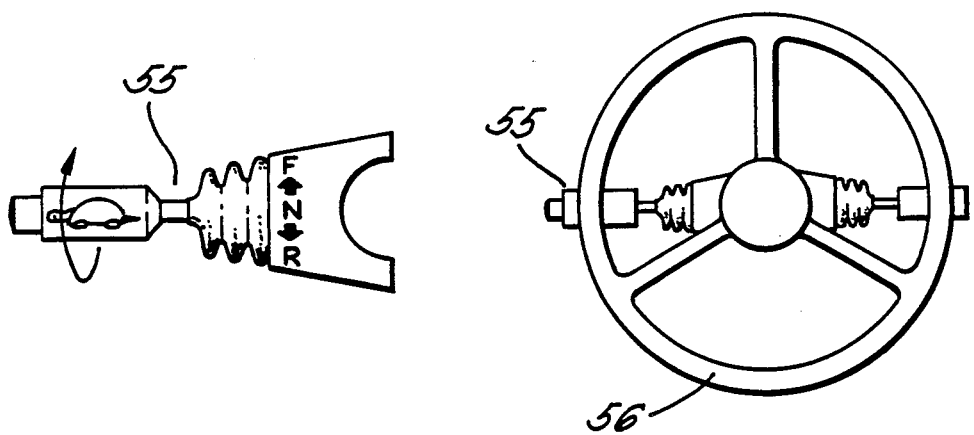
FIG. 5 is a side elevation of a steering wheel and control lever used in the control system of FIG. 2.

Operation of the four solenoid valves 46,47,48,49 is by control switches which may be embodied in a single control 55, as shown in FIG. 5, mounted on the column of the steering wheel 5.

The many advantages of the system include:

(1) that the speed of the engine 10 in work mode cannot be set above an intermediate setting, for example 2000 rpm;

(2) that the vehicle speeds are limited to work mode by way of the creep valve so that stalling situations are not imposed on the engine 10 due to the small (20%) resultant net power from the engine 10 being available for propulsion;

(3) the sensitivity of the pedal 18 is enhanced in work mode;

(4) in transit mode the skill of simultaneous operation of throttle 12 and pedal 18a is eliminated;

(5) in transit mode the engine 10 speed can be optimised according to forward speed desired;

(6) in transit mode the control of the vehicle speed is easier during deceleration by reducing engine 10 speed as in a normal vehicle to retard it by easing pressure on the pedal valve 18;

(7) the system is more "driver friendly" allowing a new driver to aquaint to the controls more quickly.

We claim:

1. A land vehicle having at least one drivable road wheel, hydrostatic transmission means to drive said road wheel to propel the vehicle, an engine that drives both said hydrostatic transmission means and auxiliary equipment mounted on said vehicle, a hydraulic pressure supply from the engine to the transmission means and means for controlling the speed of the vehicle, said speed control means comprising means for controlling the pressure supply to the transmission means and means connected to the pressure supply control means to control the speed of the engine whereby the engine speed is restricted to a preset limit when the auxiliary equipment is operating and the speed of the engine can be increased when the auxiliary equipment is inert and the vehicle in transit.

2. A land vehicle as claimed in claim 1 in which the pressure supply control means is driver operable by means of a single control.

3. A land vehicle as claimed in claim 2 in which the single control is activated by an extremity of the driver.

4. A land vehicle as claimed in claim 1 in which the pressure supply control means further comprises a pressure regulating control valve.

5. A land vehicle as claimed in claim 4 in which the control valve controls the speed of the engine.

6. A land vehicle as claimed in claim 4 in which the control valve has a first mode of operation in which the pressure supplied to the hydrostatic transmission means is substantially equal to the pressure supplied to the control valve.

7. A land vehicle as claimed in claim 4 in which the control valve has also a mode of operation in which the pressure supplied to the hydrostatic transmission means is less than the pressure supplied to the control valve.

8. A land vehicle as claimed in claim 7 in which the pressure supplied to the hydrostatic transmission means is one third of the pressure supplied to the control valve.

9. A land vehicle as claimed in claim 4 in which the control valve is used to select forward or reverse directions of travel.

10. A land vehicle as claimed in claim 4 in which the control valve is electrically operable.

11. A land vehicle as claimed in claim 1 further comprising a hydraulic actuator for controlling the engine speed.

12. A land vehicle as claimed in claim 11 in which the pressure for activating the actuator is controlled by the pressure supply control means.

13. A land vehicle as claimed in claim 11 in which the hydraulic actuator is not operable below a pre-set pressure input.

14. A land vehicle as claimed in claim 13 in which the actuator is not operable below a pressure input of 8 bar.

15. A land vehicle as claimed in claim 11 in which the actuator is spring biased to prevent the engine speed from increasing above a preset limit unless the pressure supplied thereto overcomes the precompression of the spring.

16. A land vehicle as claimed in claim 1 further comprising a driver operated throttle lever for manually controlling the engine speed.

17. A land vehicle as claimed in claim 1 in which the hydrostatic transmission means comprises at least one motor and at least one pump, wherein said pump is driven by the engine, which controls the motor which is connected to drive the at least one road wheel.

18. A land vehicle as claimed in claim 1 further comprising a secondary pump to provide a servo control pressure supply.

19. A land vehicle as claimed in claim 1 further comprising adjustable means for restricting the top engine speed.

* * * * *